US009387461B2

(12) United States Patent
Wu et al.

(10) Patent No.: US 9,387,461 B2
(45) Date of Patent: Jul. 12, 2016

(54) CATALYST SUPPORT MATERIALS WITH OXYGEN STORAGE CAPACITY (OSC) AND METHOD OF MAKING THEREOF

(75) Inventors: Wei Wu, Ann Arbor, MI (US); Yunkui Li, Ann Arbor, MI (US); Jeffery Lachapelle, Northville, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 382 days.

(21) Appl. No.: 13/996,073

(22) PCT Filed: Dec. 22, 2011

(86) PCT No.: PCT/US2011/066715
§ 371 (c)(1),
(2), (4) Date: Jun. 20, 2013

(87) PCT Pub. No.: WO2012/088373
PCT Pub. Date: Jun. 28, 2012

(65) Prior Publication Data
US 2013/0274096 A1    Oct. 17, 2013

Related U.S. Application Data

(60) Provisional application No. 61/425,958, filed on Dec. 22, 2010.

(51) Int. Cl.
| | |
|---|---|
| *B01J 23/10* | (2006.01) |
| *B01J 23/63* | (2006.01) |
| *B01J 35/00* | (2006.01) |
| *B01J 35/10* | (2006.01) |
| (Continued) | |

(52) U.S. Cl.
CPC ............. *B01J 23/63* (2013.01); *B01J 35/002* (2013.01); *B01J 35/1014* (2013.01); *B01J 35/1019* (2013.01); *B01J 35/1038* (2013.01); *B01J 35/1042* (2013.01); *B01J 35/1061* (2013.01); *B01J 37/0018* (2013.01); *B01J 37/0045* (2013.01); *B01J 37/0205* (2013.01); *B01J 37/0207* (2013.01); *B01J 37/0215* (2013.01); *B01J 37/031* (2013.01); *B01D 53/945* (2013.01); *B01D 2255/102* (2013.01); *B01D 2255/2063* (2013.01); *B01D 2255/2068* (2013.01); *B01D 2255/2092* (2013.01); *B01D 2255/407* (2013.01); *B01D 2255/908* (2013.01); *B01J 21/04* (2013.01); *B01J 21/066* (2013.01); *B01J 35/023* (2013.01); *B01J 2523/00* (2013.01); *Y02T 10/22* (2013.01)

(58) Field of Classification Search
CPC ........... B01J 23/63; B01J 21/066; B01J 21/04
USPC ................................. 502/304, 303, 349, 355
See application file for complete search history.

(56) References Cited

U.S. PATENT DOCUMENTS

| 4,868,150 A | 9/1989 | Spooner et al. |
| 5,593,654 A | 1/1997 | Decker et al. |

(Continued)

FOREIGN PATENT DOCUMENTS

| EP | 1618951 | 1/2006 |
| EP | 1712279 | 10/2006 |

(Continued)

OTHER PUBLICATIONS

ISRWO of PCT/US2011/066715 dated Dec. 3, 2012.
He, Xiaokun, et al.; Influence of $Al_2O_3$/CeZrAl Composition on the Catalytic Behavior of Pd/Rh catalyst; ScienceDirect; Journal of Rare Earths; vol. 28, No. 1, Feb. 2010, pp. 59-63.
Hilliard, Henry E.; Platinum-Group Metals; U.S. Geological Survey Publications—Minerals Information.
Wang, Jun, et al.; Effect of Interaction Between $Ce_{0.7}Zr_{0.3}O_2$ and $Al_2O_3$ on Structurals Characteristics, Thermal Stability, and Oxygen Storage Capacity; J. Phys. Chem. C (2008), vol. 112, No. 13; pp. 5113-5122.
Wei, Zhenling, et al.; Preparation and Property Investigation of $CeO_2$-$ZrO_2$-$Al_2O_3$ Oxygen-Storage Compounds; Journal of Alloys and Compounds; vol. 455 (2008), pp. 322-326.

(Continued)

*Primary Examiner* — Matthew E Hoban
*Assistant Examiner* — James Fiorito
(74) *Attorney, Agent, or Firm* — Brinks Gilson & Lione

(57) ABSTRACT

A new type of catalyst support with oxygen storage capacity (OSC) and methods of making the same are disclosed. The composition ratio is $x(Ce_{1-w}Zr_wO_2):yM:zL:(1-x-y-z)Al_2O_3$, where $Ce_{1-w}Zr_wO_2$ is the oxygen storage composition with stabilizer $ZrO_2$, molar ratio (w) in the range of 0 to about 0.8, and a weight ratio (x) of about 0.05 to about 0.8; M is an interactive promoter for oxygen storage capacity with a weight ratio (y) of 0 to about 0.10; and L is a stabilizer for the support $Al_2O_3$ with weight ratio (z) of from 0 to about 0.10. In some cases, M or L can act as both OSC promoter and thermal stabilizer. The weight percentage range of ceria-zirconia and other metal and rare earth oxides (x+y+z) is from about 5 to about 80% relative to total oxides. Combining platinum group metals (PGM) and adhesive with the catalyst supports, a new wash coat made therefrom is provided that comprises a mixture of catalyst support materials according to the relationship (a)RE-Ce—$ZrO_2$+(β)CZMLA+(1-a-β)RE-$Al_2O_3$, where RE-Ce—$ZrO_2$ is a commercial OSC material of rare earth elements stabilized ceria zirconia having a weight ratio (a) ranging from 0 to about 0.7; CZMLA is the catalyst support material of the present disclosure having a weight ratio (β) ranging from about 0.2 to about 1 such that (α+β)<1; and RE-$Al_2O_3$ is rare earth element stabilized alumina having a weight ratio equal to (1−α−β). The new wash coat made therefrom exhibits a lower activation temperature compared with traditional formulation of wash coat by at least 50° C. The new wash coat made therefrom also requires less RE-Ce—$ZrO_2$ oxide and/or less PGM in the formulation of emission control catalyst for gasoline and diesel engines.

10 Claims, 4 Drawing Sheets

(51) Int. Cl.
  *B01J 37/00* (2006.01)
  *B01J 37/02* (2006.01)
  *B01J 37/03* (2006.01)
  *B01J 21/06* (2006.01)
  *B01J 21/04* (2006.01)
  *B01D 53/94* (2006.01)
  *B01J 35/02* (2006.01)

(56) References Cited

U.S. PATENT DOCUMENTS

| | | |
|---|---|---|
| 6,133,194 A | 10/2000 | Cuif et al. |
| 2002/0192150 A1 | 12/2002 | Glazov et al. |
| 2008/0009410 A1 | 1/2008 | Okamoto et al. |
| 2009/0258781 A1 | 10/2009 | Maruki et al. |
| 2010/0040523 A1 | 2/2010 | Larcher et al. |
| 2010/0285956 A1 | 11/2010 | Li |

FOREIGN PATENT DOCUMENTS

| | | |
|---|---|---|
| EP | 2127744 | 12/2009 |
| WO | 2009029070 | 3/2009 |

OTHER PUBLICATIONS

Zahir, Hasan, M.D., et al.; Preparation and Characterization of Mesoporous Ceria-Zirconia-Alumina Nanocomposite with High Hydrothermal Stability; J. Mater. Res., vol. 22, No. 11 (Nov. 2007); pp. 3201-3209.

Zahir, Hasan, M.D., et al.; Mesoporous $CeO_2$-$ZrO_2$-y-$Al_2O_3$ Nanocomposite Membranes Exhibiting Remarkable Hydrothermal Stability; Desalination and Water Treatment; vol. 2; (2009); pp. 223-230.

Zhang, Xiaoyu, et al.; $CeO_2$-$ZrO_2$-$La_2O_3$-$Al_2O_3$ Composite Oxide and its Supported Palladium Catalyst for the Treatment for Exhaust of Natural Gas Engined Vehicles; Journal of Natural Gas Chemistry, vol. 18; (2009); pp. 139-144.

Zhang, Qingwei, et al.; Effect of Different Mixing Ways in Palladium/Ceria-Zirconia/Alumina Preparation on Partial Oxidation of Methane; Journal of Rare Earths; vol. 23, No. 5; (Oct. 2008); p. 700.

Zhao, Bo, et al; Preparation of $Ce_{0.67}Zr_{0.33}O_2$ Mixed Oxides As Supports of Improved Pd-only Three-Way Catalysts; Applied Catalysis B: Environmental 96 (2010) pp. 338-349.

CATALYST SUPPORT MATERIALS WITH OXYGEN STORAGE CAPACITY (OSC) AND METHOD OF MAKING THEREOF

CROSS REFERENCE TO RELATED APPLICATIONS

This application is a continuation of PCT Application Ser. No. PCT/US2011/066715 filed Dec. 22, 2011, designating the United States and published in English, which claims the benefit of the filing date under 35 U.S.C. §119(e) of U.S. Provisional Application No. 61/425,958 filed Dec. 22, 2010, the entire contents of each of which are hereby incorporated herein by reference.

FIELD

The invention relates to inorganic complexes, especially to catalyst support materials having oxygen storage capacity and high thermal stability, their method of manufacture and applications thereof. The materials of this disclosure can be incorporated into wash-coats of gasoline or diesel engine exhaust catalytic converters.

BACKGROUND

A typical wash coat includes a catalyst support of gamma, delta, and theta alumina or lanthanum (La) stabilized alumina, $Ce-ZrO_2$ with oxygen storage capacity and Platinum group metals (PGM), such as Pt, Pd, and Rh introduced by nitrate solutions. The PGM can be coated on the cordierite honeycomb substrate combined in the slurry mixture of the catalyst support material and Oxygen Storage material or the PGM can be coated as separate step following the coating of the wash coat slurry (catalyst support material and Oxygen Storage material) to make the catalyst. The function of the catalyst is to change most of the pollution of the atmosphere from mobile engine exhaust consisting of carbon monoxide (CO), all kinds of hydrogen carbon compounds (HC), and nitrogen oxygen compounds ($NO_x$) into innocuous carbon dioxide ($CO_2$), water ($H_2O$), and Nitrogen ($N_2$).

As a catalyst support, large fresh specific surface area (SSA) is necessary to supply as many as possible catalytic active sites, meanwhile the thermal stability at high temperature is also very important to maintain catalytic activity of separated sites during operation. High SSA and highly thermal stable La-alumina is a typical catalyst support material.

As an important composition of a three-way catalyst (TWC), zirconia-stabilized ceria and other ceria based oxides play a major role in oxygen storage and release under lean and rich fuel conditions, thereby, enabling the oxidation of CO and volatile organics and the reduction of $NO_x$. High efficient catalytic performance also relates to high specific surface area and thermal stability, as well as high oxygen storage capacity.

Pure ceria is the best oxygen storage material, but its poor thermal stability limits its application at high temperature. Zirconia stabilized ceria, $CeO_2-ZrO_2$, has improved the materials' thermal stability and oxygen storage capacity compared with $CeO_2$. The complex oxide with a molar ratio of Ce to Zr of 1:1 can form a solid solution $Ce_{0.5}Zr_{0.5}O_2$ of cubic phase, which improves OSC performance. Nevertheless, the thermal stability of this kind of material is poor after aging at high temperature, for example, after aging at 1000° C. for several hours, the specific surface area of this material will typically be less than 30 m²/g.

Alumina is one example of a thermal stabilizer additive for use with $CeO_2-ZrO_2$. Other additives include alkaline earth, rare earth and silicon elements or mixture thereof. The total amount of such stabilizers added is usually controlled to be less than 10 wt. % based on the entire amount of oxides present. However, more recently, up to 90 wt. % alumina has been added into $CeO_2-ZrO_2$ for improving thermal stability and OSC. The introduction of alumina into Ce—Zr oxide is known to result in efficient improvement of thermal stability and OSC.

Normally 30-70% Ce—Zr oxide is mixed with La-gamma alumina and platinum group metals (PGM) to make wash coat in a typical TWC application. Ceria-zirconia manufacturing cost is much higher than alumina due to the use of much more organic materials and/or a hydrothermal process. Accordingly, there exists a desire to provide new types of catalyst support materials having high thermal stability and high OSC in order to reduce the usage of $Ce-ZrO_2$ or eliminate the usage of $Ce-ZrO_2$.

SUMMARY

In overcoming the enumerated drawbacks and other limitations of the related art, the present disclosure generally provides a new type of catalyst support (CZMLA) with high OSC and production methods thereof. The composition ratio is $x(Ce_{1-w}Zr_wO_2):yM:zL:(1-x-y-z)Al_2O_3$ with x, y, and z representing weight percentage of each component in the composition. The $Ce_{1-w}Zr_wO_2$ is an oxygen storage component with stabilizer $ZrO_2$ in which the molar ratio (w) ranges from 0 to about 0.8 and weight ratio (x) from about 0.05 to about 0.80. The M component is an interactive promoter for oxygen storage capacity with weight ratio (y) ranging from 0 to about 0.1. The L component is a stabilizer for the $Al_2O_3$ support with weight ratio (z) ranging from 0 to about 0.1. The weight percentage range of ceria-zirconia and other metal and rare earth oxides (x+y+z) is from about 5 to about 80 wt. % relative to the total oxides. Combining platinum group metals (PGM) with the catalyst support, the new wash coat made therefrom will require less or does not require $Ce-ZrO_2$ oxide in the formulation of the three-way catalyst used in an automobile engine exhaust converter.

The catalyst support materials have high thermal stability. For example, calcined at 950° C. for 5 hours, the catalyst support materials have SSA of at least 100 m²/g. After aging at 1000° C. for 5 hours in air, the aged SSA is greater than about 95 m²/g and for 20 hours at least 80 m²/g. For hydrothermal aging of 10% steam/air at 1000° C. for 20 hours, the SSA is greater than about 60 m²/g. The catalyst support materials also exhibit higher oxygen storage capacity than normal Ceria-Zirconia based products.

According to one aspect of the present disclosure, a new type of catalyst support material with high thermal stability and high OSC for use as a three-way catalyst (TWC) in an automobile engine exhaust convertor is provided that can partly or fully replace existing wash coat compositions. According to another aspect of this disclosure, a method of making said materials that result in lower manufacturing costs is provided. In other words, the materials made according to the method of the present disclosure will require less or do not require $Ce-ZrO_2$ in the wash coat of the TWC.

According to another aspect of the present disclosure, a new wash coat composition includes a combination of support materials having the weight ratios shown below:

$$(\alpha)RE-Ce-ZrO_2+(\beta)CZMLA+(1-\alpha-\beta)Re-Al_2O_3$$

where RE-Ce—ZrO₂ is a commercial OSC material of rare earth element stabilized ceria zirconia having a weight ratio (α) ranging from 0 to about 0.7 and CZMLA is a material prepared according to the teachings of the present disclosure having a weight ratio (β) ranging from about 0.2 to about 1 with (α+β)≤1. Re—Al₂O₃ is a rare earth elements stabilized alumina support. The alumina may be described as a weak gamma phase. In the case where (α+β)=1, there is no Re-Alumina component present in the composition and in the case when (α)=0 there is no commercial ceria zirconia present in the composition. Upon combining platinum group metals (PGM) with the above catalyst support and an adhesive, the new wash coat will require less Ce—ZrO₂ oxide or PGM in the formulation of a three-way catalyst (TWC) to obtain similar performance as to a conventional TWC when used for an automobile engine exhaust converter or the new wash coat will not require Ce—ZrO₂ oxide. In addition, the resulting wash coat prepared according to the teachings of the present disclosure exhibits lower activation energy than a conventional wash coat that includes a mixture of Ce—ZrO₂ and RE-alumina.

BRIEF DESCRIPTION OF THE DRAWINGS

The drawings described herein are for illustration purposes only and are not intended to limit the scope of the present disclosure in any way.

DETAILED DESCRIPTION

Figure 1:
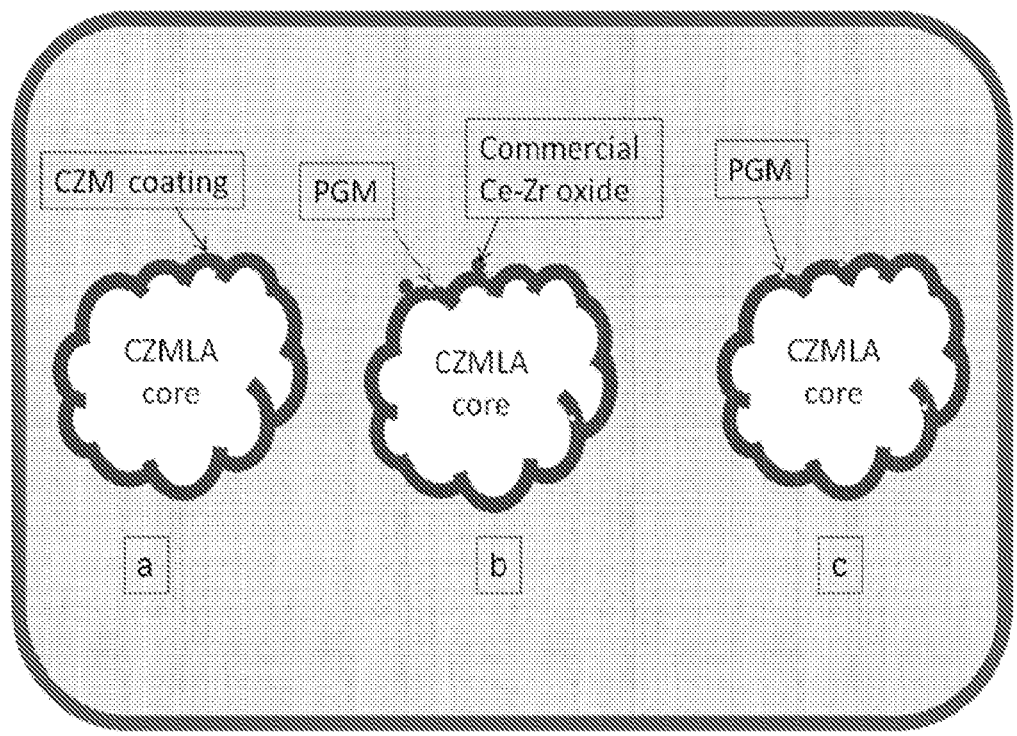
FIG. 1(a) is a schematic representation of the texture of catalyst support materials or powder prepared according to the teachings of the present disclosure.
FIG. 1(b) is a schematic representation of the wash coat composition with additional commercial Ce—ZrO₂.
FIG. 1(c) is a schematic representation of the wash coat composition without additional commercial Ce—ZrO₂.

The following description is merely exemplary in nature and is in no way intended to limit the present disclosure or its application or uses. It should be understood that throughout the description and drawings, corresponding reference numerals indicate like or corresponding parts and features.

The present disclosure generally provides a catalyst support material (CZMLA) having a high oxygen storage capacity (OSC) with following formula:

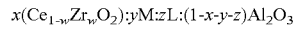

$x(Ce_{1-w}Zr_wO_2):yM:zL:(1-x-y-z)Al_2O_3$ in which, $Ce_{1-w}Zr_wO_2$ is the oxygen storage composition with the subscript w, a molar ratio ranging from 0 to about 0.8 and x being a weight ratio ranging from about 0.05 to about 0.80; M is an interactive promoter for the oxygen storage capacity with weight ratio y ranging from 0 to about 0.10; and L is a stabilizer for the Al₂O₃ support with weight ratio z ranging from 0 to about 0.10. The weight percentage range of ceria-zirconia and other metal and rare earth oxides (x+y+z) in the composition is from about 5 to about 80 wt. % relative to the total oxides present. The remainder (1-x-y-z) is aluminum oxides.

The interactive promoter, M, may be chosen from anyone of alkaline earth oxides, transition metal oxides, or rare earth oxides including elements from No.'s 39 and 57-71 in the element periodic table or a combination thereof. The support stabilizer, L, may be chosen from anyone of alkaline earth oxides, transition metal oxides, or rare earth oxides including elements from No.'s 39 and 57-71 in the element periodic table or a combination thereof. L and M may be chosen to comprise the same alkaline earth, rare earth, or transition metal oxide or a different alkaline earth, rare earth, or transition metal oxide. In some cases, M or L can act as both OSC promoter and thermal stabilizer.

The catalyst support materials provided herein include layer texture materials comprising a catalyst support core covered by a solid solution as shown in FIG. 1(a). The catalyst support core powders may be prepared by batch or continuous co-precipitation according to the formula $x_1(Ce_{1-w}Zr_wO_2):y_1M:zL:(1-x-y-z)Al_2O_3$. The catalyst support solid solution has a formula of $x_2(Ce_{1-w}Zr_wO_2):y_2M$ with $x_2=x-x_1$ and $y_2=y-y_1$. The solid solution is coated onto the core powders, in which $0≤x_1/x<1$, alternatively $0.2≤x_1/x≤0.8$, or alternatively $0.4≤x_1/x≤0.6$, and $0≤y_1/y<1$, alternatively $0.2≤y_1/y≤0.8$, or alternatively $0.4≤y_1/y≤0.6$.

The catalyst support core powders may be prepared via a co-precipitation method. The basic solution and acidic solution used for the co-precipitation can be NaAlO₂ solution and nitrate solution of cerium, zirconium and other rare earth elements, respectively. Also basic solutions of ammonia solution, ammonium carbonate and ammonium hydrogen carbonate or their mixture and acidic mixture nitrates solution of aluminum, cerium, zirconium and alkaline earth elements and other rare earth elements can be used to neutralize the acidic solution to make the catalyst support core powders.

During the co-precipitation, the pH may be selected to be in the range of about 6 to about 10, alternatively in the range of about 7 to about 9; and the precipitation temperature selected to be in the range of about 48 to 80° C. Under this condition, pseudo-boehmite can be precipitated. The precipitate is then filtered, washed and finally dried with or without surfactants to obtain a precursor of the core powders. When utilized, the surfactants may include anyone or a combination of polyvinyl alcohol (PVA), polyvinyl amine, polyethylene glycol-200 (PEG-200), isopropyl alcohol (IPA), ethanol, and melamine with the dosage or amount ranging from about 1% to about 30%, alternatively about 6 to about 10%. The solid core powder precursor is calcined at about 500 to about 1100° C. for about 2-6 hours to get oxide core powders of the catalyst support. Alternatively, the precursor is calcined at about 600 to about 800° C. for about 3-5 hours.

The solid solution, $x_2(Ce_{1-w}Zr_wO_2):y_2M$ may be coated on the catalyst support core powders using a solution of acetate or nitrate of cerium, zirconium, alkaline earth elements, transition metal elements and other rare earth elements using an incipient wetness impregnation method or a spray drying method, in which the dried powders are obtained by oven drying during the incipient wetness impregnation method. The coated powders are then calcined in a furnace at a higher temperature that ranges between about 500 and about 1100° C. for about 3-6 hours. The final products have a texture comprising the catalyst support core covered or coated by the solid solution.

According to another aspect of the present disclosure, when $x_1/x=1$ and $y_1/y=1$, the catalyst support materials may be prepared as homogeneous bulk distributed materials. Batch or continuous co-precipitation can be used for making this type of materials. The basic solution and acidic solution used in co-precipitation can be $NaAlO_2$ solution and nitrate solution of cerium, zirconium and other rare earth elements, respectively. Also ammonia solution, ammonium carbonate and ammonium hydrogen carbonate and the mixture nitrates solution of aluminum, cerium, zirconium, and other rare earth elements can be used for the co-precipitation. The pH may be chosen to be in the range of about 6 to about 10, alternatively in the range of about 7 to about 9. The precipitation temperature is selected to be in the range of about 48 to 80° C.

The precipitate is filtered, washed and then spray dried or oven dried with or without surfactants to become a dried hydrate ready for calcination, in which the surfactants may include anyone or a combination of polyvinyl alcohol (PVA), polyvinyl amine, polyethylene glycol-200 (PEG-200), isopropyl alcohol (IPA), ethanol. The amount or dosage of the surfactant is in the range of 1% to 30%, alternatively about 6% to about 10%. The said precursor is calcined at about 500 to 1100° C. for about 3-6 hours to get final oxide powders of the catalyst support.

According to another aspect of the present disclosure, spray pyrogenation of acetate or nitrate solution of cerium, zirconium, alkaline earth elements, transition metal elements and rare earth elements, as well as aluminum, can be used for making the bulk catalyst support materials. After spray pyrogenation, the powders can be calcined according to the procedures and parameters described above.

The catalyst support layer and bulk materials prepared according to the teachings of the present disclosure exhibit high thermal stability. For example, the materials calcined at 950° C. for 5 hours has a surface area (SA) of at least 100 $m^2/g$. After aging at 1000° C. for 20 hours in air, the aged SA is greater than about 85 $m^2/g$. After hydrothermal aging in a 10% water vapor (steam)/90% air environment at 1000° C. for 20 hours, the SA is greater than 45 $m^2/g$, alternatively greater than 55 $m^2/g$, alternatively greater than 65 $m^2/g$.

The catalyst support materials prepared according to the teachings of the present disclosure have particle size D50 of about 1 to about 100 microns, alternatively about 10 to about 50 microns.

The catalyst support materials also have higher oxygen storage capacity than conventional products made from a mechanical mixture of La-Alumina and Zirconia stabilized Ceria before and after aging at high temperature of up to about 1000° C.

According to another aspect of the present disclosure, a new wash coat composition includes a combination of support materials having the weight ratios shown below:

(α)RE-Ce—$ZrO_2$+(β)CZMLA+(1-α-β)Re—$Al_2O_3$ where RE-Ce—$ZrO_2$ is a commercial OSC material of rare earth element stabilized ceria zirconia having a weight ratio (α) ranging from 0 to about 0.7 and CZMLA is a material prepared according to the teachings of the present disclosure having a weight ratio (β) ranging from about 0.2 to about 1 with (α+β)≤1. Re—$Al_2O_3$ is a rare earth elements stabilized alumina support having a weight ratio equal to (1-α-β). The alumina support may be comprised of a weak gamma phase, alternatively comprised of other phases or a mixture thereof. In the case where (α+β)=1, there is no Re-Alumina component present in the composition and in the case when (α)=0 there is no commercial ceria zirconia present in the composition. Upon combining platinum group metals (PGM) with the above catalyst support and an adhesive, the new wash coat made therefrom will require less RE-Ce—$ZrO_2$ oxide and/or less PGM in the formulation of emission control catalyst for gasoline and diesel engines as shown in FIG. 1(b), or the new wash coat will not require Ce—$ZrO_2$ oxide as shown in FIG. 1(c).

The new wash coat composition exhibits an activation temperature that is at least 50° C. lower, alternatively at least 75° C. lower, than the activation temperature of a conventional wash coat formulation that includes a mixture of Ce—$ZrO_2$ and RE-$Al_2O_3$. In addition, the new wash coat composition incorporates one or more platinum group metals (PGM) in an amount that is at least 10 wt. % less, alternatively at least 50 wt. % less, than the amount of PGM incorporated in a conventional wash coat formulation that includes a mixture of Ce—$ZrO_2$ and RE-$Al_2O_3$ and exhibits a similar level of catalytic performance.

The following specific examples are given to illustrate the disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

In the following examples, a HORIBA LA-920 laser particle sizer is used for the measurement of particle size distribution, a Rigaku MiniFlex II DESKTOP X-ray diffractometer is used for the measurement of phase, a Micromeritics TriStar II 3020 Surface Area and Porosity is used for the measurement of BET and a Spectro Analytical Instruments Model FCPSA83D ICP is used for analysis of chemical compositions. The hydrothermal aging is conducted in a quartz tube furnace equipped with a vapor generator using a volume of 10% vapor with the balance being air at about 1000° C. for about 20 hours and an air flow rate of about 4.2 L/min. A Micromeritics Autochem 2920 II is used to test temperature programed reduction (TPR). The TPR is measured from 25° C. to 900° C. with a temperature ramp rate of 30° C./min and a constant 90% argon/10% hydrogen gas flow rate of 5 $cm^3$/min. All samples are hydrothermally aged for TPR measurements.

EXAMPLE 1

Figure 2:
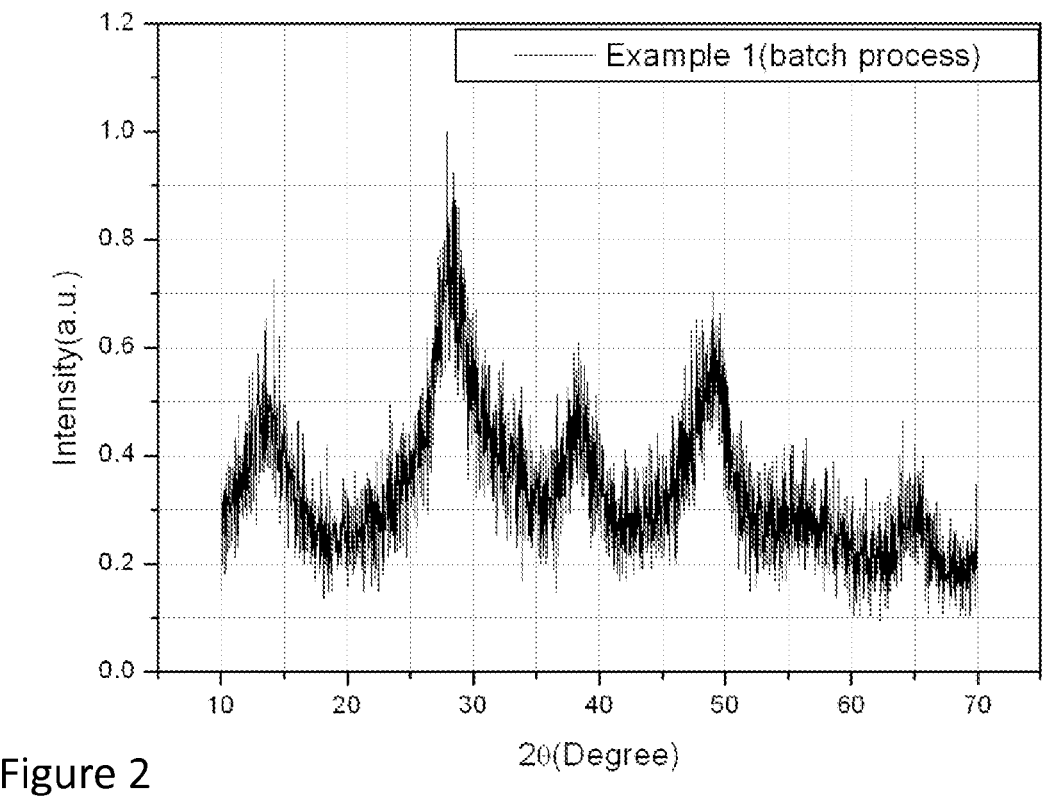
FIG. 2 is a graphical representation for the XRD pattern of a precipitate of the catalyst support core before calcination.

$NaAlO_2$ solution and mixture solution of $Ce(NO_3)_3$, $ZrO(NO_3)_2$, $Nd(NO_3)_3$, and $La(NO_3)_3$ are used for making catalyst support precursor cores with weight ratio of $CeO_2$:$ZrO_2$: $Nd_2O_3$: $La_2O_3$:$Al_2O_3$=9:9:1:1:60, in which, $ZrO_2$ is the stabilizer of oxygen storage material $CeO_2$, $Nd_2O_3$, and $La_2O_3$ are both promoters for Ce—$ZrO_2$ and stabilizers for $Al_2O_3$. A 10 liter tank reactor is used for precipitation. The basic solution is pumped into the tank reactor containing 4 liters of initial water with a flow rate of 2 L/h. The acidic solution is used to neutralize basic solution at 48° C. and 8.5 pH. After 1 hour, the precipitation stops and the temperature is maintained at 48° C. for 1 hour. Then, separation of solid-liquid is performed using a funnel filter and the wet cake is washed using 16 L ammonia water of pH 9.5-10 to remove $NaNO_3$ and other soluble impurities. After washing, the wetcake is reslurried using 6 liters of deionized (DI) water and 50 cc PEG-200 solution for 30 minutes, then spray dried to get powders of hydroxides of the catalyst support. The measured XRD pattern shows that the phase of the powder is pseudo-boehmite (see FIG. 2).

Figure 3:
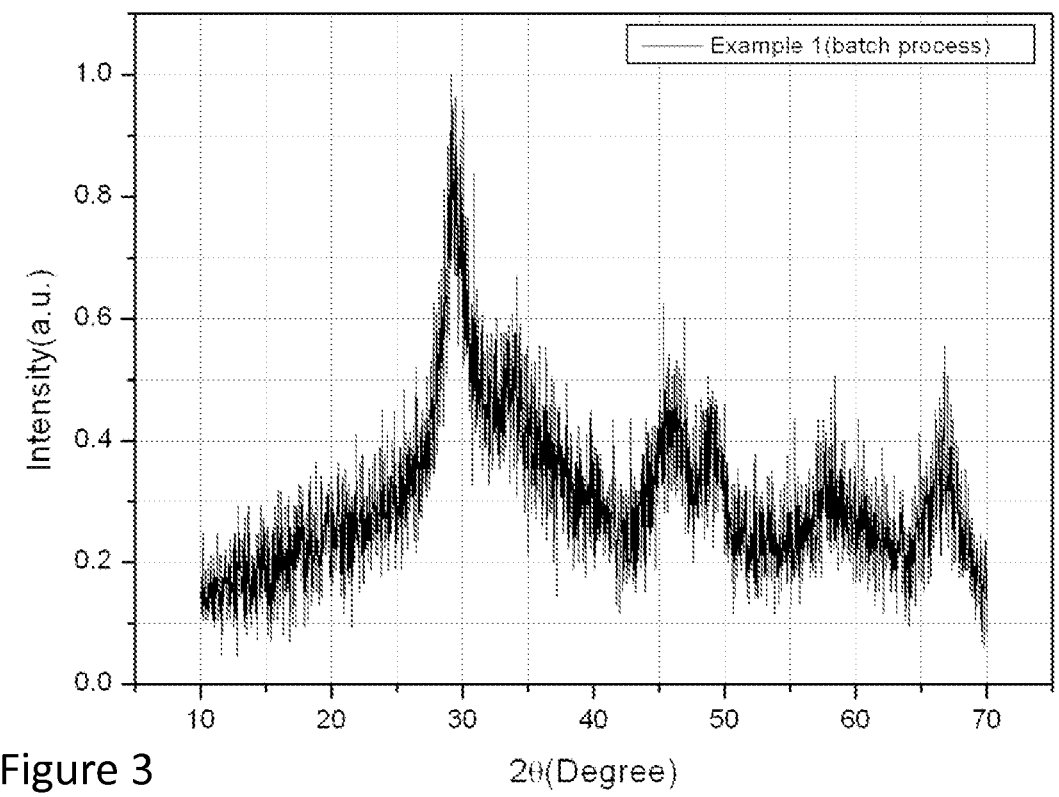
FIG. 3 is a graphical representation for the XRD pattern of the solid solution of catalyst support core after calcination at 700° C. for 5 hours.

The powders are calcined at 700° C. for 5 hours to get 500 grams (99.5% solid content) of precursor core of the catalyst support with a composition ratio of $CeO_2$:$ZrO_2$:$Nd_2O_3$:

$La_2O_3$ equal to 8.8:9.3:0.97:0.93:60 and sodium oxide at 200 ppm. BET testing gave a fresh SSA of 176.5 m$^2$/g, a pore volume (PV) of 0.875 cc/g and a pore diameter (PD) of 19.8 nm. Particle size D50 is 37.4 microns. The measured XRD pattern shows mainly solid solution (Ce, Zr)O$_2$ of tetragonal phase (see FIG. 3).

Figure 4:
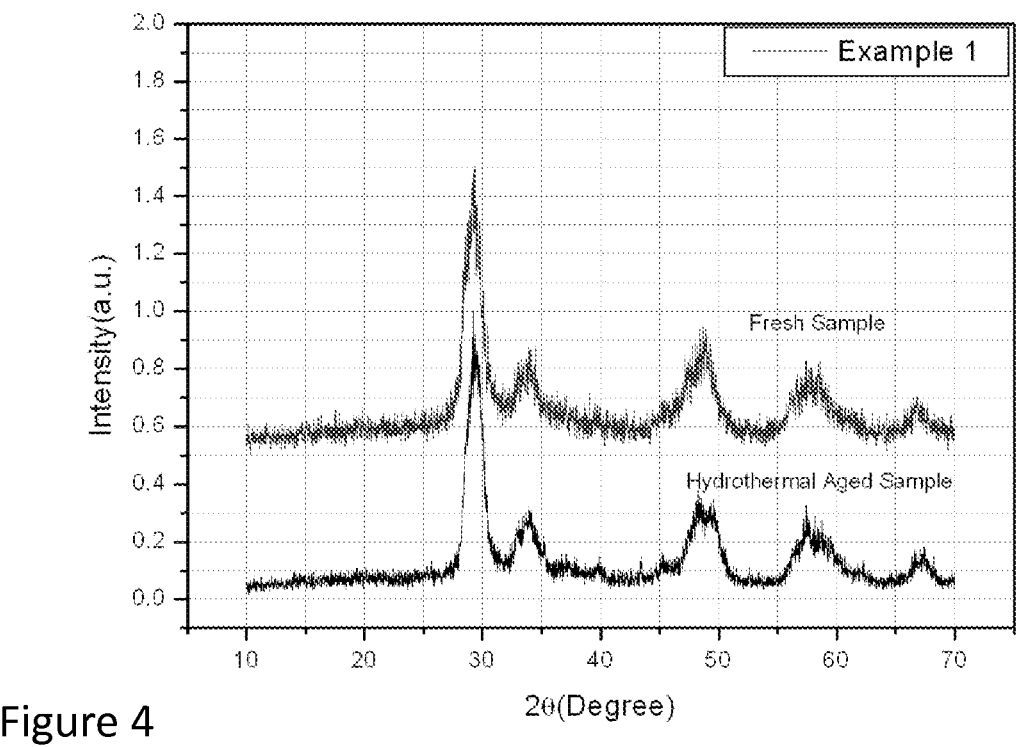
FIG. 4 is a graphical comparison of the XRD patterns of fresh and hydrothermal aged catalyst support materials.

The 500 grams of powders obtained above represent the precursor of the catalyst support for impregnation. A total of 870 mL of acetate solution of $CeO_2$, $ZrO_2$, $Nd_2O_3$ and $La_2O_3$ is used for impregnating the rest of the $CeO_2$, $ZrO_2$, $Nd_2O_3$ and $La_2O_3$ in two times and then the impregnated catalyst support powders are dried in an oven at 120° C. for 5 hours. The impregnated powders are calcined at 950° C. for 5 hours to obtain the final catalyst support material. The measured XRD pattern shows solid solution (Ce, Zr)O$_2$ of tetragonal phase with a trace amount of alumina phase (see FIG. 4).

Figure 5:
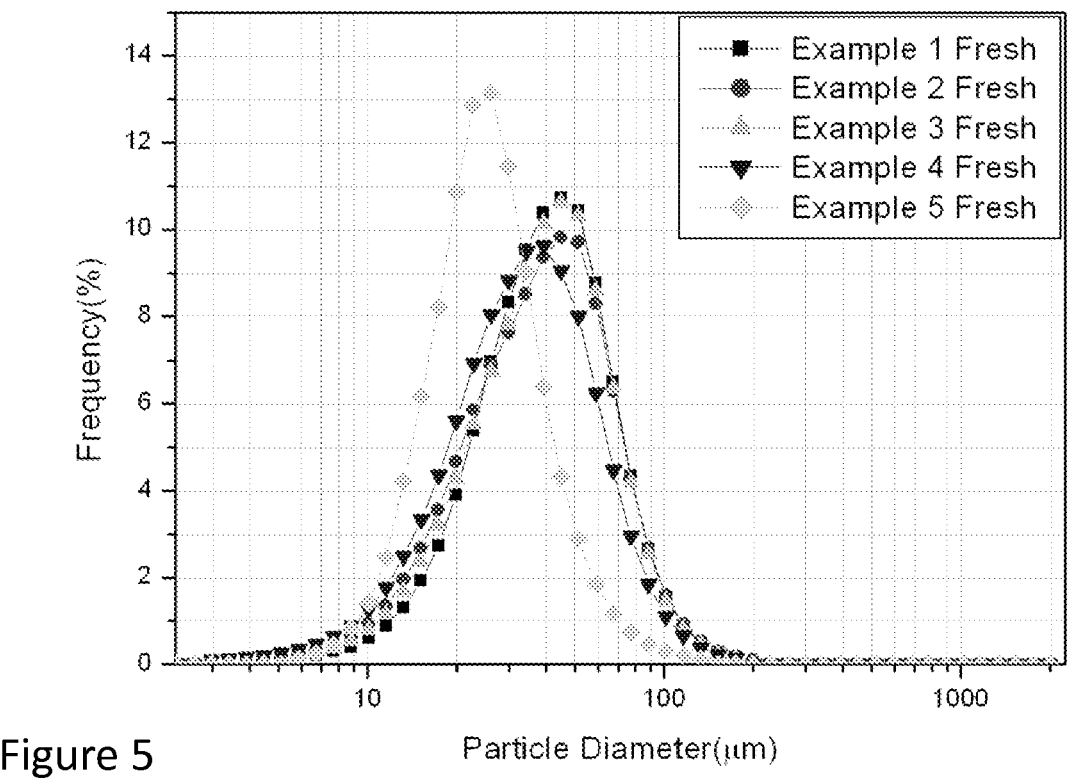
FIG. 5 is a graphical comparison of the particle size distributions of the catalyst support materials.
Figure 6:
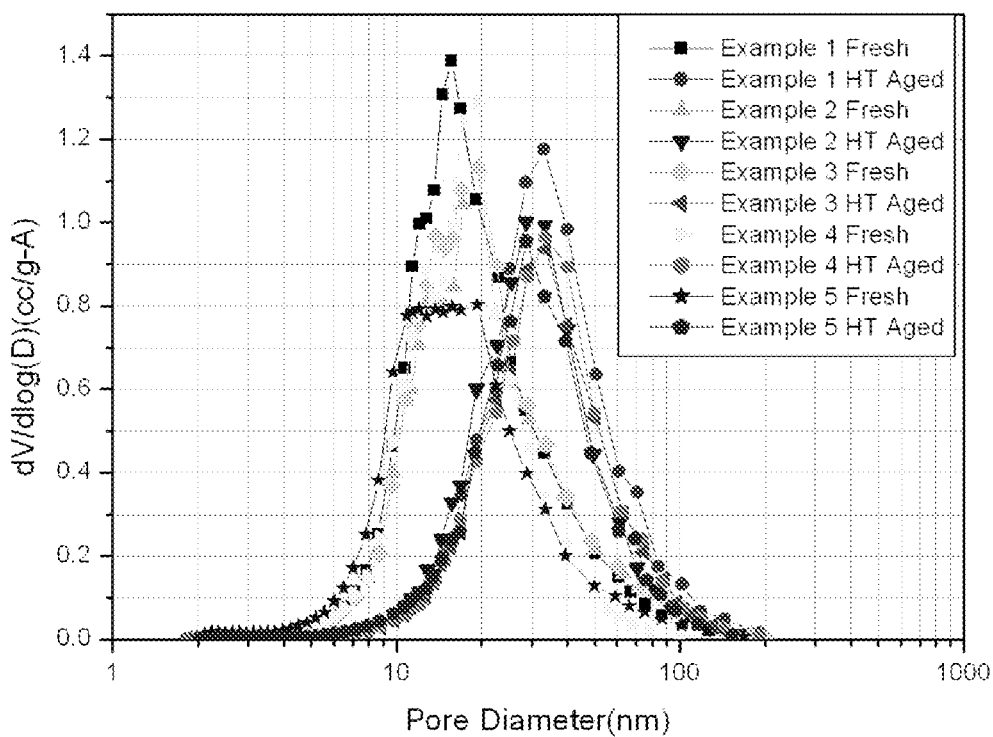
FIG. 6 is a graphical comparison of the pore size distributions of the fresh and hydrothermal aged catalyst support materials.

ICP analysis gave a composition ratio of $CeO_2$:$ZrO_2$:$La_2O_3$:$Nd_2O_3$:$Al_2O_3$ equal to 17.8:18.2:1.9:2.1:60. Particle size distribution is shown in FIG. 5. The D50 is 37.6 microns. BET testing gave a fresh SSA of 114.0 m$^2$/g, PV of 0.62 cc/g and PD of 19.8 nm. Aged SSA, PV and PD in air at 1000° C. for 20 hours are 93.5 m$^2$/g, 0.58 cc/g and 24.8 nm, respectively. Hydrothermal aged SSA, PV and PD at 1000° C. for 20 hours are 64.2 m$^2$/g, 0.57 cc/g and 35.5 nm, respectively. Pore size distributions of fresh and hydrothermal aged samples are shown in FIG. 6.

EXAMPLE 2

Catalyst supported materials are prepared the same as described in Example 1 except that 40 grams melamine is added instead of 60 grams PEG-200 in slurry for spray drying. The chemicals used and the resulting XRD pattern of fresh and aged samples are similar to that of Example 1 (see FIG. 4). The particle size distribution is shown in FIG. 5 and the particle diameter, D50 is 36.4 microns. BET testing gave a fresh SSA of 101.6 m$^2$/g, PV of 0.552 cc/g and PD of 31.7 nm. Aged SSA, PV, and PD in air at 1000° C. for 20 hours are 87.8 m$^2$/g, 0.530 cc/g and 24.1 nm, respectively. Hydrothermal aged SSA, PV, and PD at 1000° C. for 20 hours are 62.8 m$^2$/g, 0.474 cc/g and 30.4 nm, respectively. Pore size distributions of fresh and hydrothermal aged samples are shown in FIG. 6.

EXAMPLE 3

Catalyst supported materials are prepared the same as Example 1, except for not adding surfactant in the slurry for spray drying. The chemicals and the resulting XRD pattern of fresh and aged samples are similar to that of Example 1 (see FIG. 4). The particle size distribution is shown in FIG. 5 and the particle diameter, D50 is 37.1 microns. BET testing gave a fresh SSA of 103.8 m$^2$/g, PV of 0.582 cc/g and PD of 22.5 nm. Aged SSA, PV, and PD in air at 1000° C. for 20 hours are 86.6 m$^2$/g, 0.536 cc/g and 24.8 nm, respectively. Hydrothermal aged SSA, PV, and PD at 1000° C. for 20 hours are 56.0 m$^2$/g, 0.450 cc/g and 32.1 nm, respectively. Pore size distributions of fresh and hydrothermal aged samples are shown in FIG. 6.

EXAMPLE 4

Catalyst supported materials are prepared the same as Example 3, except for the use of a continuous process instead of a batch process for making the precursor core of the catalyst support. The BET of the precursor calcined at 700° C. for 5 hours gave an SSA of 163.5 m$^2$/g, PV of 0.795 cc/g and PD of 19.4 nm. Particle size (D50) is 29.5 microns. The measured XRD pattern shows mainly tetragonal phase solid solution (Ce, Zr)O$_2$. The chemicals and the XRD pattern of fresh and aged material are similar to Example 1 (see FIG. 4). The particle size distribution is shown in FIG. 5 and the particle diameter, D50 is 37.1 microns. The BET of the CZNLA sample shows SSA of 104.8 m$^2$/g, PV of 0.528 cc/g and PD of 20.2 nm. The aged SSA, PV, and PD in air at 1000° C. for 20 hours are 88.3 m$^2$/g, 0.539 cc/g and 24.4 nm, respectively. Hydrothermal aged SSA, PV, and PD are 56.4 m$^2$/g, 0.504 cc/g and 35.8 nm, respectively. Pore size distributions of fresh and hydrothermal aged samples are shown in FIG. 6.

EXAMPLE 5

The basic solution used is the same as in Example 1, but a different mixture solution of $Ce(NO_3)_3$, $ZrO(NO_3)_2$, $Nd(NO_3)_3$, and $La(NO_3)_3$ is used for making core of the catalyst support. A continuous process is used for making the precursor core of the catalyst support. The precursor core of the catalyst support calcined at 700° C. for 5 hours has a fresh SSA, PV, and PD of 149.5 m$^2$/g, 0.599 cc/g and 15.5 nm, respectively. After impregnating the rest with $CeO_2$, $Zr_2O_2$, $Nd_2O_3$ and $La_2O_3$, the impregnated powder is calcined at 900° C. for 5 hours. The final fresh material has a composition ratio of $CeO_2$:$ZrO_2$:$Nd_2O_3$:$La_2O_3$:$Al_2O_3$=15.21:30.83:1.97:2.49:49.5 and a particle size of 23.3 microns. The particle size distribution is shown in FIG. 5. Fresh SSA, PV, and PD are 107 m$^2$/g, 0.490 cc/g and 18.3 nm, respectively. Hydrothermal aged SSA, PV, and PD are 60.0 m$^2$/g, 0.436 cc/g and 29.2 nm. Pore size distributions of fresh and hydrothermal aged samples are shown in FIG. 6.

EXAMPLE 6

Co-Precipitation Method for Bulk Material $NaAlO_2$ solution and mixture solution of $Ce(NO_3)_3$, $ZrO(NO_3)_2$, $Nd(NO_3)_3$, and $La(NO_3)_3$ are used for making the catalyst support. Co-precipitation conditions are same as in Example 1, except for the volume of ammonia water being 20 liters instead of 16 liters. The final catalyst support fired at 950° C. for 5 hours has a fresh SSA of 90 m$^2$/g, PV of 0.350 cc/g, and PD of 15.6 nm. The hydrothermal aged SSA is 49.4 m$^2$/g.

EXAMPLE 7

Spray Drying Method for Layer Material

A total of 1000 grams of G200 Pseudoboehmite (produced by Pacific Industrial Development Corporation, Ann Arbor, Mich.) containing 62.4% oxide was used as precursor and added in to a 6 liter acetate solution containing 187.2 gms $CeO_2$, 187.2 gms $ZrO_2$, 20.8 gms $Nd_2O_3$, and 20.8 gms $La_2O_3$ under stirring. Powders are obtained by spray drying and calcination at 950° C. for 5 hours. The fresh SSA, PV, and PD are 137.4 m$^2$/g, 0.355 cc/g, and 10.3 nm, respectively. The hydrothermal aged SSA is 54 m$^2$/g.

EXAMPLE 8

Preparation of (0.5 wt. % Pd:49.75 wt. % Ref): 49.75 wt. % CZMLA)

A commercial Nd—Pr—CeZrO2 material is used as the reference (Ref) material in the composition shown above.

Figure 7:
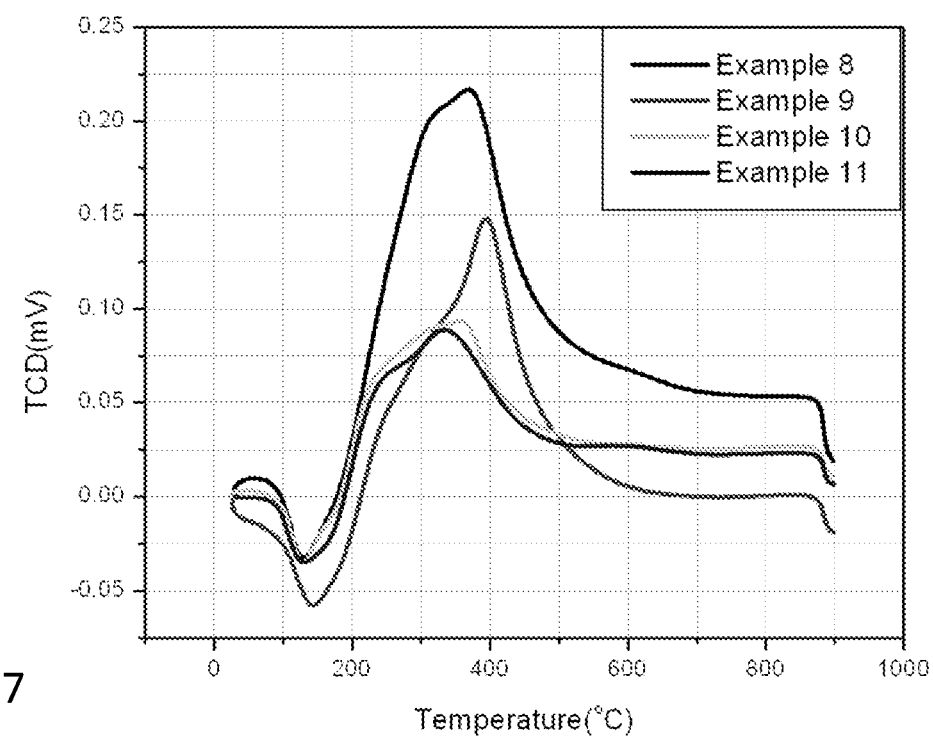
FIG. 7 is a graphical comparison of the temperature programmed reduction of catalyst support materials doped with precious metal palladium (Pd).

First, a Pd(NO$_3$)$_2$ solution is impregnated onto the surface of reference (Ref) material in an amount that provides a weight ratio 0.5 wt % in the total or overall mixture as further described below. The impregnated Ref material is then calcined at 500° C. for 3 hours, then mechanically mixed with the CZMLA of Example 4 according to provide a mixture having a weight ratio of 0.5 wt. % Pd:49.75 wt. % Ref:49.75 wt. % CZMLA. The mixture exhibits a fresh SSA of 87 m$^2$/g, PV of 0.386 cc/g and PD of 17.8 nm, as well as a hydrothermally aged SSA of 36 m$^2$/g, PV of 0.297 cc/g and PD of 32.9 nm. The mixture of 0.1020 grams was weighed for use in temperature programed reduction (TPR) measurement. The TPR pattern is shown in FIG. 7 with a maximum peak at 368° C. and T50 (temperature at half maximum) at 243° C. The hydrogen reduction capacity calculated by the TPR program is 0.5466 mmolH$_2$/gram sample, which corresponds to 0.2733 mmolO$_2$/gram sample.

EXAMPLE 9

Preparation of (0.5 wt. % Pd:49.75 wt. % Ref):49.75 wt. % SB-200-08-L4

In this example, a Lanthana-alumina (SB-200, Pacific Industrial Development Corp., Ann Arbor, Mich.) with SSA of 200 m$^2$/g, a pore volume (PV) 0.82 cc/g and 4% La$_2$O$_3$ is used instead of CZMLA, all other materials are the same as previously described in Example 8. The resulting mixture having the weight ratio of the various components according to (0.5 wt. % Pd:49.75 wt. % Ref):49.75 wt. % SB-200-08-L4 exhibits a fresh SSA of 118 m$^2$/g, PV of 0.450 cc/g, and PD of 15.2 nm, as well as a hydrothermally aged SSA of 48 m$^2$/g, PV of 0.368 cc/g, and PD of 30.7 nm. The mixture of 0.1020 g was weighed for TPR measurement. The measured TPR pattern is shown in FIG. 7 with a maximum peak at 394° C. and T50 at 293° C. The hydrogen reduction capacity calculated by the TPR program is 0.2265 mmolH$_2$/gram sample, which is corresponds to 0.1133 mmolO$_2$/gram sample. The OSC for the material in this example is 41%.

EXAMPLE 10

Preparation of (0.5 wt. % Pd:[24.875 wt. % Ref:24.875 wt. % CZMLA]): 49.75 wt. % SB-200-08-L4

In this example, CZMLA is used to replace one-half of the Reference (Ref) material with the palladium (Pd) being impregnated on both surfaces of the CZMLA and Ref materials; all other materials are the same as previously described in Example 9. The resulting mixture having the weight ratio of the various components according to (0.5 wt. % Pd:[24.875 wt. % Ref:24.875 wt. % CZMLA]): 49.75 wt. % SB-200-08-L4 exhibits a fresh SSA of 126 m$^2$/g, PV of 0.537 cc/g and PD of 17.0 nm, as well as a hydrothermally aged SSA of 64 m$^2$/g, PV of 0.435 cc/g and PD of 27.2 nm. The mixture of 0.1020 g was weighed for TPR measurement. The measured TPR pattern is shown in FIG. 7 with a maximum peak at 356° C. and T50 at 214° C. The hydrogen reduction capacity calculated by the TPR program is 0.2248 mmolH$_2$/gram sample, which corresponds to 0.1139 mmolO$_2$/gram sample. The OSC for the material in this example is equivalent to that in Example 9.

EXAMPLE 11

Preparation of (0.5 wt. % Pd:24.875 wt. % Ref): 24.875 wt. % CZMLA:49.75 wt. % SB-200-08-L4

In this example, CZMLA to replace one-half of the reference (Ref) material with the palladium (Pd) being impregnated only on the surface of the Ref. material, all other materials are the same as previously described in Example 10. The resulting mixture having the weight ratio of the various components according to (0.5 wt. % Pd:24.875 wt. % Ref):24.875 wt. % CZMLA:49.75 wt. % SB-200-08-L4 exhibits a fresh SSA of 139 m$^2$/g, PV of 0.579 cc/g and PD of 16.7 nm, as well as a hydrothermally aged SSA of 62 m$^2$/g, PV of 0.459 cc/g and PD of 29.6 nm. The mixture of 0.1020 g was weighed for TPR measurement. The measured TPR pattern is shown in FIG. 7 with a maximum peak at 334° C. and T50 at 223° C. The hydrogen reduction capacity calculated by the TPR program is 0.2156 mmolH$_2$/gram sample, which is corresponds to 0.1078 mmolO$_2$/gram sample. The OSC for the material in this example is 95 percent of the OSC of Example 9.

A person skilled in the art will recognize that the measurements described above are standard measurements that can be obtained by a variety of different test methods. Any test methods described herein represents only one available method to obtain each of the required or desired measurements.

The foregoing description of various embodiments of the present disclosure has been presented for purposes of illustration and description. It is not intended to be exhaustive or to limit the present disclosure to the precise embodiments disclosed. Numerous modifications or variations are possible in light of the above teachings. The embodiments discussed were chosen and described to provide the best illustration of the principles included in the present disclosure and its practical application to thereby enable one of ordinary skill in the art to utilize the teachings of the present disclosure in various embodiments and with various modifications as are suited to the particular use contemplated. All such modifications and variations are within the scope of the present disclosure as determined by the appended claims when interpreted in accordance with the breadth to which they are fairly, legally, and equitably entitled.

What is claimed is:

1. A catalyst support material with oxygen storage capacity, the catalyst support material comprising:
    ceria-zirconia; the ceria-zirconia having oxygen storage capacity;
    an optional interactive promoter (M) for oxygen storage;
    an aluminum oxide support; and
    an optional stabilizer (L) for the aluminum oxide support;
    wherein the catalyst support material (CZMLA) has the formula:

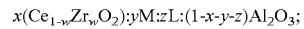
    $x(Ce_{1-w}Zr_wO_2){:}yM{:}zL{:}(1{-}x{-}y{-}z)Al_2O_3;$ in which w is a molar ratio between 0 and about 0.8; and x, y, and z are weight ratios based on the total oxides in the CZMLA, such that x is within the range of about 0.05 to about 0.80, while y and z are within the range of 0 to about 0.10 with the remainder (1-x-y-z) being aluminum oxide;
    wherein the support material comprises a catalyst support core powder having a formula:

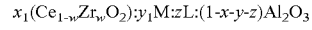
    $x_1(Ce_{1-w}Zr_wO_2){:}y_1M{:}zL{:}(1{-}x{-}y{-}z)Al_2O_3$ and a solid solution coated onto the core powder having a formula:

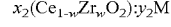
    $x_2(Ce_{1-w}Zr_wO_2){:}y_2M$ wherein $x_2=x-x_1$ and $y_2=y-y_1$ and in which $0.2 \leq x_1/x \leq 0.8$ and $0.2 \leq y_1/y \leq 0.8$.

2. The catalyst support material of claim 1, in which the weight percentage range of ceria-zirconia, interactive promoter, and stabilizer (x+y+z) is from about 5 to about 80wt. % relative to the total oxides in the support material.

3. The catalyst support material of claim 1, wherein M is chosen as one from an alkaline earth oxide, a transition metal oxide, and a rare earth metal oxide.

4. The catalyst support material of claim 1, wherein L is chosen as one from an alkaline earth oxide, a transition metal oxide, and a rare earth metal oxide.

5. The catalyst support material of claim 1, wherein M and L are compositionally different from one another.

6. The catalyst support material of claim 1, wherein M and L are compositionally the same.

7. The catalyst support material of claim 1, wherein the catalyst support material includes a solid solution $(Ce, Zr)O_2$ of cubic or tetragonal phase and an alumina of weak gamma phase.

8. catalyst support material of claim 1, wherein the catalyst support material has a fresh specific surface area (SSA) of greater than 80 $m^2/g$.

9. The catalyst support material of claim 1, wherein the catalyst support material has a hydrothermal aged specific surface area (SSA) of greater than 45 $m^2/g$.

10. The catalyst support material of claim 1, wherein the catalyst support material has a particle size (D50) in the range of 1 to 100 microns.

\* \* \* \* \*